United States Patent
Clark et al.

(10) Patent No.: US 7,150,988 B2
(45) Date of Patent: Dec. 19, 2006

(54) CONTROLLING PROTEOLYTIC ACTION IN NATURAL RUBBER LATEX

(75) Inventors: Paul Clark, Greenfield, IN (US); Jack Trautman, Middleton, WI (US)

(73) Assignees: Roche Diagnostics Operations, Inc., Indianapolis, IN (US); Allergen Reduction, Inc., Middleton, WI (US)

( * ) Notice: Subject to any disclaimer, the term of this patent is extended or adjusted under 35 U.S.C. 154(b) by 0 days.

(21) Appl. No.: 11/011,706

(22) Filed: Dec. 14, 2004

(65) Prior Publication Data

US 2006/0127970 A1  Jun. 15, 2006

(51) Int. Cl.
*C07G 17/00* (2006.01)
(52) U.S. Cl. ..................................................... 435/267
(58) Field of Classification Search ................ 528/930, 528/932
See application file for complete search history.

(56) References Cited

U.S. PATENT DOCUMENTS 5,531,918 A * 7/1996 Outtrup et al. ............. 510/320
5,569,740 A   10/1996 Tanaka et al.
5,777,004 A   7/1998  Trautman
6,380,283 B1  4/2002  Perrella et al.

OTHER PUBLICATIONS

Musolyamov, A. Kh. et al., "Cationic Inhibitors of Serine Proteinases from Buckwheat Seeds," Biochemistry(Moscow) vol. 66, No. 9, 2001, pp. 1157-1164.
Protease Inhibitors—Action Table, www.serva.de/products/knowledge/061311.shtml.

* cited by examiner

*Primary Examiner*—Jean C. Witz
*Assistant Examiner*—Satyendra K. Singh
(74) *Attorney, Agent, or Firm*—Marilyn L. Amick; Roche Diagnostics Operations, Inc.

(57) ABSTRACT

A method for controlling proteolytic action in manufacturing enzyme-treated natural rubber latex and products made therefrom. The method involves adding a protease inhibitor such that hydrolysis by protease enzymes is stopped. A preferred inhibitor is a low molecular weight, cationic protease inhibitor from *Fagopyrum esculentum* having stability in the pH range of 2–12.

5 Claims, No Drawings

CONTROLLING PROTEOLYTIC ACTION IN NATURAL RUBBER LATEX

FIELD OF THE INVENTION

The present invention relates to the field of natural rubber latex, in particular, to a method for manufacturing enzyme-treated natural rubber latex and products made therefrom, and more particularly, to a method for controlling proteolytic action in enzyme-treated, natural rubber latex.

BACKGROUND OF THE INVENTION

Allergenic reactions to natural rubber latex products have been recognized for several decades and range from allergic contact dermatitis to systemic allergic reactions. It has been determined that such allergic reactions are IgE-mediated and are due to allergenic proteins found in natural rubber latex. See, for example, Truscott, W., *Latex Allergy* 15(1):89–121, 1995. Products made from natural rubber latex are found everywhere and are used in various industrial, commercial, medical, and home applications. Medical products made of natural rubber latex include exam and surgical gloves, anesthesia mask and bags, catheters, injection ports, dental dams, condoms, diaphragms, balloons, and blood pressure cuffs. Non-medical natural rubber latex products include toy balloons, household gloves, and foam mattresses and pillows. During the manufacture of these products, naturally occurring proteins in natural rubber latex can migrate to the surface and potentially cause an allergenic reaction in the user.

Several protocols for removing protein allergens from finished latex articles have been proposed, but all suffer from functional or economic shortcomings. For example, wet-stripping latex gloves off the molds is reported to remove a large amount of protein allergens, but adapting existing facilities to accommodate wet-stripping is extremely expensive. Using a post-stripping process such as chlorination to degrade protein allergens has also been proposed, but such a process must be carefully monitored in order to prevent adversely impacting the physical properties of the latex article. Washing the finished articles after oven curing has also been proposed but is also prohibitively expensive to incorporate into conventional manufacturing environments. Treatment of the finished article with protease enzymes has been proposed. However, as noted below, such a treatment fails to eliminate the allergenicity of latex articles. See Truscott, W., *Latex Allergy* 15 (1): 89–121, 1995.

U.S. Pat. No. 5,777,004 describes a method of neutralizing protein allergens in natural rubber latex by treating a latex emulsion with protease and peptidase enzymes whereby the protein allergens are degraded so as to be rendered non-allergenic to humans. Although this method provides an economically feasible protocol without serious adverse affects to the physico-mechanical properties of finished latex articles, the problem remains that there is no way to control the extent of the hydrolytic reaction, i.e., there is no way to stop the reaction after the desired amount of hydrolysis has been obtained. Continued hydrolysis of the latex emulsion by protease and peptidase enzymes can lead to instability of the latex emulsion.

U.S. Pat. No. 6,380,283 describes a method of treating natural rubber latex that involves enzyme treatment utilizing a chemical stabilizer and treatment with antioxidants that allows for chlorination processing. However, the problem of controlling the extent of hydrolysis remains and is not addressed.

SUMMARY OF THE INVENTION

It is against the above background that the present invention provides certain unobvious advantages and advancements over the prior art. In particular, the inventor has recognized a need for improvements in a process for controlling proteolytic action in natural rubber latex.

In accordance with one embodiment of the present invention, a process is provided for treating a natural rubber latex emulsion containing protein allergens, the process comprising treating the latex emulsion with a protease enzyme such that the protein allergens are substantially hydrolyzed to polypeptide fragments and amino acids and then adding a protease inhibitor such that hydrolysis by the protease enzyme is substantially reduced. In particular, the protease inhibitor is one having stability at a pH greater than about 10. Especially preferred is a cationic, serine protease inhibitor from *Fagopyrum esculentum*.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

DETAILED DESCRIPTION OF THE INVENTION

In order that the invention may be more readily understood, reference is made to the following examples, which are intended to illustrate the invention, but not limit the scope thereof.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The present invention relates to a process for treating a natural rubber latex emulsion containing protein allergens, the process comprising treating the latex emulsion with a protease enzyme such that the protein allergens are substantially hydrolyzed to polypeptide fragments and amino acids and then adding a protease inhibitor such that hydrolysis by the protease enzyme is substantially reduced. In particular, the protease inhibitor is a serine protease inhibitor having stability at pH's greater than about 10. Especially preferred is a cationic protease inhibitor from *Fagopyrum esculentum*. Such inhibitors include BWI-1c, BWI-2c, BWI-3c, and BWI-4c, which are low molecular weight, cationic, serine protease inhibitors having stability between pH 2–12. By "stability" of a protease inhibitor, it is meant that the inhibitor does not rapidly hydrolyze or lose its ability to inhibit protease enzyme activity.

In practicing the present invention, portions of latex are volumetrically taken and warmed to the desired hydrolysis temperature, which may range from about 20° C. to 36° C. The protease solutions are then added and stirred for about ten minutes. The amount of enzyme added will depend upon the temperature of hydrolysis, the potency of the enzyme used, the desired time to accomplish the optimal increase in trichloroacetic acid (TCA) solubles, the latex pH, which may range from 9.2 to 11 depending on the amount of ammonium hydroxide added, the stirring conditions, the age of the latex emulsion, and the country of origin of the latex, i.e., southeast Asia or Africa. A complete discussion of treating natural rubber latex with protease enzymes is found in U.S. Pat. No. 5,777,004, the content of which is incorporated herein by reference.

The volume of the aqueous solution containing the enzyme may be as little as 0.2% of the latex volume to approximately 20%. This volume is determined by the subsequent dilution needed during the compounding step. Since the allergens are found in the aqueous phase of the emulsion, increasing this phase makes them more readily available for hydrolysis by the proteases. By standardizing the hydrolysis conditions, the TCA results are comparable to evaluating normal seasonal variations in the latex as it is tapped from the rubber trees. Generally, the desired increase in TCA solubles is 4 to 5 mg/g latex emulsion. This represents when the allergens are hydrolyzed into 7 amino acid residues or less (when no allergens are detected by present assays) and before measurable reductions in emulsion stability occur.

Inhibitors suitable for use in the present invention are serine protease inhibitors having stability at a pH greater than about 10, especially in the pH range of about 10–12. Preferred inhibitors are low molecular weight, cationic inhibitors having stability in the pH range of 2–12. Especially preferred are protease inhibitors having stability at pH's greater than about 10, and most especially preferred are inhibitors having stability at pH's greater than about 11. In the examples described herein, protease inhibitors from *Fagopyrum esculentum* have been used; however, one skilled in the art to which the present invention belongs might also choose to use alternate or modified inhibitors which have similar physicochemical properties and amino acid sequences as the inhibitors from *Fagopyrum esculentum*. For example, inhibitors having modifications to the amino acid sequence at locations other than the reactive site would be expected to be suitable for use in the present invention. The data on the physicochemical properties and amino acid sequences suggest that BWI-3c and BWI-4c inhibitors belong to the potato proteinase inhibitor I family.

No other protease inhibitors having stability in highly alkaline solutions, i.e., solutions having a pH greater than about 10, are currently known to the present inventors, although such inhibitors likely exist but have yet to be isolated and/or characterized. Other protease inhibitors are known to rapidly hydrolyze and lose their ability to inhibit at high pH's. A number of inhibitors were tried and found to be unsuitable in the present invention. These included aprotinin (trypsin inhibitor from bovine lung, known to denature at pH>12), PEFABLOC SC (4-2-aminoethyl)-benzenesulfonyl fluoride hydrochloride, known to have limited stability above pH 7.5), leupeptin-hemisulfate (pH stability unknown), phenylmethyl sulfonyl fluoride (PMSF, known to be unstable in aqueous solutions), diiospropylfluorophosphate (DFP, aqueous solutions known to be unstable), TLCK (1-chloro-3-tosylamido-7-amino-2-heptanone HCl, known to be unstable above pH 7), TPCK (1-chloro-3-tosylamido-4-phenyl-2-butanone, known to be unstable at alkaline pH), and soybean trypsin inhibitor (known to be sensitive to heat and high pH). An overview of frequently used protease inhibitors is given in "Protease Inhibitors: Application Table" at http://www.serva.de/products/sheets/proteases.pdf.

The effectiveness of an inhibitor to reduce or stop proteolytic action is measured by first hydrolyzing with a selected protease to achieve about half (2.0–2.5 mg/g) the desired TCA increase, then dividing the sample into two portions and adding the inhibitor solution to one portion, continuing the hydrolysis conditions, and measuring any further increase in TCA solubles.

Since the specificity of the active site of each protease varies, the effective molar ratio of protease to inhibitor will be determined by the hydrolysis conditions.

SPECIFIC EMBODIMENTS

Example 1

Determination of Trichloroacetic Acid (TCA) Solubles

In Example 2 below, the extent of hydrolysis was determined by measuring the amount of TCA solubles in mg/g of latex emulsion following hydrolysis by protease enzymes.

A dilution solution was prepared consisting of 25% (v/v) isopropyl alcohol in water. To this solution was added 1 g KOH/liter. A 15% trichloroacetic acid solution was prepared to which 1 ml concentrated $H_3PO_4$/100 ml was added. A spectrophotometer was calibrated with a solution consisting of 90 ml dilution solution and 10 ml TCA solution.

A standard hydrolysate solution was made by preparing a solution containing 2.25 mg/ml of casein hydrolysate having 60–65% DH (degree of hydrolysis), no visible cloudiness, and no cloudiness upon addition of TCA. Dilutions of the standard solution were made to contain 1.00, 1.25, 1.50, 1.75, and 2.00 mg/ml of casein hydrolysate. Absorbance was measured at 280 nm. A standard curve was constructed by plotting absorbance versus hydrolysate concentration.

To measure TCA solubles in latex emulsion samples, the sample was first stirred with a magnetic stirrer for 10 minutes. 10±0.03 gm of the latex sample was placed into a beaker to which 100 ml of dilution solution was added with stirring. Next, 10.0 ml of diluted sample was pipetted into a test tube. Following addition of 1.0 ml of TCA solution, the top of the tube was covered, and the tube was vigorously inverted until a latex plug developed and the liquid phase became slightly clear. Next, the latex plug was compressed with a stirring rod and transferred to a funnel using qualitative filter paper (Fisher Type P4, 2–5 µm retention). The first 1–3 ml was returned to filter. After setting the spectrophotometer to zero absorbance using the calibration solution, the absorbance of the sample was measured. The hydrolysate content (TCA solubles) in mg was determined multiplying the absorbance by the dilution factor (11.1).

Example 2

Inhibition of Proteolytic Action by Low Molecular Weight Inhibitors

Proteolytic enzymes tested were NOVOZYM FM (Novozymes A/S), SAVINASE (Novozymes A/S), and GAMMAPROTEASE RFG 660L (Gamma Chemie GmbH). The protease inhibitor used was a combination of low molecular weight protein inhibitors of serine proteinases from buckwheat *Fagopyrum esculentum* seeds (BWI-1c, BWI-2c, BWI-3c, and BWI-4c). Research quantities of isolated inhibitors were obtained from M. A. Belozersky. The inhibitors had been prepared as described in Tsybina, T. A., et al., *Biochemistry* (*Moscow*), Vol. 66, No. 9, pp. 941–947, 2001, the content of which is herein incorporated by reference. The procedure used for preparation of the inhibitors is reproduced below as Example 3.

The inhibitor preparation used in this example was a mixture of 3 parts BWI-3c and 2 parts BWI-4c. The concentration used was 22 mg/L latex emulsion. Inhibitor weights given are purified weights.

Latex emulsion samples were treated with proteolytic enzymes for 2 days at 28° C. Portions of centrifuged HA latex (60% latex) were taken and 0.5% enzyme solution added. After 2 days, 22 mg/L inhibitor was added in 0.9% water, the mixture stirred, and the samples maintained at 28° C. Samples were analyzed at 8, 21, and 35 days to determine the amount of hydrolysis products (TCA solubles). The results are shown in Table 1.

g for 25 min at 5° C. The fraction of soluble proteins was subjected to affinity chromatography on a trypsin-SEPHAROSE 4B column synthesized using CNBr-activated SEPHAROSE 4B.

The inhibitors were sorbed on the affinity column in buffer A containing 0.5 M NaCl at 4° C. for 4 h. Unbound proteins were thoroughly washed off, and the inhibitors were eluted with 1 mM HCl, pH 2.7, containing 0.5 M NaCl.

The resulting inhibitor fraction was concentrated and dialyzed against 10 mM K,Na-phosphate, pH 6.8 (buffer B). The total preparation of inhibitors (10 mg) was applied to a Mono-Q anion-exchange column (Pharmacia, Sweden) (FPLC regime) in buffer B, and the fraction of inhibitors not bound to the column under these conditions, was collected. This fraction was applied to a Mono-S cation-exchange column (FPLC regime) in buffer B. The fraction of unbound proteins was separated, and proteins sorbed on the ion exchanger were eluted with a linear NaCl gradient (0–0.2 M, 1 ml/min, 25 min). Two protein fractions (BWI-1c and BWI-2c) with trypsin inhibiting activity were found in the eluate.

The non-sorbed proteins were concentrated and equilibrated with 0.1 M citrate-phosphate, pH 4.0 (buffer C), and further applied to a Mono-S column (FPLC regime) in buffer C. the sorbed proteins were eluted with a linear NaCl gradient (0–0.2 M, 10 min, 1 ml/min). Two protein fractions (BWI-3c and BWI-4c) possessing significant trypsin inhibiting activity were found in the eluate.

TABLE 1

| Enzyme | TCA solubles with and without inhibitor | | | | | | |
|---|---|---|---|---|---|---|---|
| | 2 days | 8 days | Δ | 21 days | Δ | 35 days | Δ |
| NOVOZYM FM | 1.91 | 4.97 | 3.06 | 6.21 | 4.30 | 7.64 | 5.73 |
| NOVOZYM FM + inhibitor | — | 2.55 | 0.64 | 4.89 | 2.98 | 5.50 | 3.59 |
| GAMMAPROTEASE | 3.73 | 5.66 | 1.93 | 6.68 | 2.95 | 7.20 | 3.47 |
| GAMMAPROTEASE + inhibitor | — | 5.96 | 2.23 | 7.58 | 3.85 | 8.10 | 4.37 |
| SAVINASE | 1.75 | 4.37 | 2.62 | 5.66 | 3.91 | 7.18 | 5.43 |
| SAVINASE + inhibitor | — | 1.72 | −0.03 | 3.17 | 1.42 | 4.29 | 2.54 |

After 8 days, it is observed that the inhibitor had a clear inhibiting effect on the NOVOZYM FM hydrolysis. It slowed hydrolysis from day 2 to day 8 from an increase of 3.06 mg/g to 0.64 mg/g. No inhibition was found with the GAMMAPROTEASE enzyme after 8 days. Complete inhibition was found with SAVINASE. After 35 days, no inhibition was found with GAMMAPROTEASE; however, appreciable inhibition was found with both NOVOZYM FM and SAVINASE enzymes.

Example 3

Preparation of Low Molecular Weight, Cationic Inhibitors

Dry buckwheat (*Fagopyrum esculentum* Moench cv. Shatilovskaya-5) seeds were ground in an electric mill. The proteins were extracted with 0.1 M K,Na-phosphate, pH 6.8 (buffer A) (1:4 w/v) at 4° C. for 18 h. The extract was centrifuged at 14,000 g for 40 min at 5° C. Dry $(NH_4)_2SO_4$ was added to the supernatant (to 80% saturation), and the precipitate was formed for 18 h at 4° C. The precipitate was centrifuged at 14,000 g for 40 min at 5° C. and dialyzed against buffer A (24 h, 4° C., double change of buffer). The denatured protein was separated by centrifugation at 18,000

What is claimed is:

1. A process for treating a natural rubber latex emulsion containing protein allergens, the process comprising: treating the latex emulsion with a serine protease enzyme until the desired amount of protein hydrolysis by the serine protease has been obtained, and inhibiting protein hydrolysis by adding a cationic serine protease inhibitor from *Fagopyrum esculentum*, wherein the cationic serine protease inhibitor is selected from the group consisting of BWI-3c, BWI-4c, and a combination thereof.

2. The process of claim 1 wherein the serine protease is selected from the group consisting of trypsin, subtilisin, and chymotrypsin.

3. The process of claim 1 wherein the serine protease is is trypsin.

4. The process of claim 3 wherein the cationic serine protease inhibitor is BWI-3c or BWI-4c.

5. The process of claim 1 wherein the latex emulsion is treated such that the protein allergens contained therein are degraded to polypeptide fragments which are, on average, no greater than 7 amino acid residues in size as measured by HPLC.

* * * * *